US012098834B1

(12) United States Patent
Marburger

(10) Patent No.: US 12,098,834 B1
(45) Date of Patent: Sep. 24, 2024

(54) ELECTRICAL LIGHT ASSEMBLY

(71) Applicant: Jackson Marburger, Dallas, TX (US)

(72) Inventor: Jackson Marburger, Dallas, TX (US)

( * ) Notice: Subject to any disclaimer, the term of this patent is extended or adjusted under 35 U.S.C. 154(b) by 0 days.

(21) Appl. No.: 18/600,513

(22) Filed: Mar. 8, 2024

(51) Int. Cl.
*F21V 23/06* (2006.01)
*F21S 4/10* (2016.01)
*F21V 19/00* (2006.01)
*F21V 21/002* (2006.01)
*F21V 21/08* (2006.01)

(52) U.S. Cl.
CPC ................ *F21V 23/06* (2013.01); *F21S 4/10* (2016.01); *F21V 19/0065* (2013.01); *F21V 21/002* (2013.01); *F21V 21/0824* (2013.01)

(58) Field of Classification Search
CPC .... F21V 23/06; F21V 21/0824; F21V 21/002; F21V 19/0065; F21S 4/10
See application file for complete search history.

(56) References Cited

U.S. PATENT DOCUMENTS 1,745,133 A * 1/1930 Wermine .............. F21V 21/002 439/425
2,559,706 A * 7/1951 Brooks ..................... F21S 4/10 439/590
3,231,731 A * 1/1966 Mcdonald ............. F21V 21/002 362/655
4,901,960 A 2/1990 Gary
5,062,028 A 10/1991 Frost et al.
5,386,356 A * 1/1995 Davis, Jr. ................ F21S 8/081 362/267
5,597,229 A 1/1997 Plichta et al.
5,601,448 A * 2/1997 Poon .................. F21V 21/0824 439/417
D436,218 S 1/2001 Gary et al.
6,439,744 B1 8/2002 Chanslor
D469,566 S 1/2003 Gary et al.
7,063,553 B1 * 6/2006 Mullen .................. H01R 33/46 439/336
7,938,565 B2 5/2011 Richard
(Continued)

FOREIGN PATENT DOCUMENTS

CN 2819040 Y 9/2006
CN 109163292 A 1/2019
(Continued)

OTHER PUBLICATIONS

Innovation Q+ NPL Search (Year: 2024).*
(Continued)

*Primary Examiner* — Anabel Ton
(74) *Attorney, Agent, or Firm* — Husch Blackwell LLP

(57) ABSTRACT

An electrical light assembly is provided. The electrical light assembly includes a base and a socket. The socket is configured to engage with the base in a snap configuration. The socket includes a housing with internal threads designed to receive a light bulb, a first connector, and a second connector. The first connector includes a first connection point provided in the form of a sharp point. The second connector includes a second connection point provided in the form of a sharp point. The first connection point and the second connection point being offset from one another and are designed to pierce an insulative layer of an electrical cord, providing an electrical connection between the electrical cord and the light bulb.

20 Claims, 17 Drawing Sheets

(56) References Cited

U.S. PATENT DOCUMENTS

| | | | |
|---|---|---|---|
| D816,439 S | 5/2018 | Crook et al. | |
| 10,139,083 B2 | 11/2018 | Richmond | |
| 10,941,914 B1 | 3/2021 | Hollinger | |
| 11,333,329 B2 | 5/2022 | Steele | |
| 2003/0201874 A1 | 10/2003 | Wu | |
| 2005/0117338 A1 | 6/2005 | Kratz | |
| 2009/0122564 A1* | 5/2009 | Beadle | F21V 21/0824 362/431 |
| 2016/0061432 A1* | 3/2016 | Bogart | H05B 45/382 315/201 |
| 2018/0231201 A1 | 8/2018 | Heim et al. | |
| 2023/0167969 A1 | 6/2023 | Kennedy | |

FOREIGN PATENT DOCUMENTS

| | | | | |
|---|---|---|---|---|
| EP | 2546570 A2 | 1/2013 | | |
| WO | 2008039976 A1 | 4/2008 | | |
| WO | WO-2021084417 A1 * | 5/2021 | | F21S 4/10 |

OTHER PUBLICATIONS

Scintillation Research and Analytics, "Patentability and Search Report", Dated Dec. 21, 2023, 53 Pages.

Amazon, "Lights4fun, Inc. Set of 4 Multi Colored C9 Light Bulb Battery Operated LED Outdoor Christmas Holiday Pathway Lights Markers", Accessed Jun. 14, 2024, 8 Pages, Available: https://www.amazon.com/Lights4fun-Inc-Colored-Operated-Christmas/dp/B09DGRYQ71/ref=sr_1_109?crid=HEIOL302MCTP&keywords=c9+bulb +stake&qid=1703073087&sprefix=c9+bulb+s%2Caps%2C335&sr=8-109,.

Amazon, "Lights4fun, Inc. Set of 4 Multi Colored C9 Light Bulb Outdoor Christmas Holiday Pathway Markers with Micro LEDs", Accessed Jun. 14, 2024, 8 Page, Available: https://www.amazon.com/Lights4fun-Inc-Outdoor-Christmas-Holiday/dp/B08C5L4F1B/ref=sr_1_96?crid=HEIOL302MCTP&keywords=c9%2Bbulb%2Bstake&qid=1703072892&sprefix=c9%2Bbulb%2Bs%2Caps%2C335&sr=8-96&th=1.

Mr. Resistor, "Nama 90 Solar Spike Bollard Light", Accessed Jun. 14, 2024, 3 Page, Available: https://www.mr-resistor.co.uk/product/23725.

Amazon, "Homehop Solar Light Outdoor Waterproof Smart Pathway Decoration Spike LED Automatic Powered Bollard Lamp for Home Garden Patio Lawn Ground (Warm Light, ABS)", Accessed Jun. 14, 2024, 11 Page, Available: https://www.amazon.in/Homehop-Outdoor-Waterproof-Decoration-Automatic/dp/B0C69XCTDL?th=1.

* cited by examiner

ELECTRICAL LIGHT ASSEMBLY

BACKGROUND

Electric lighting has long been used to provide illumination and decoration. Often, electric lighting is arranged as string lighting where multiple light bulbs are electrically connected to one another via a wire strand. String lighting is regularly used as a navigation aid at night or in dark environments. In addition to these functional benefits, string lighting often provides a festive atmosphere to users and are used for holiday decorations.

Traditional string lighting often uses multiple short stretches of the wire strand, which must be connected to each light. Further, in traditional string lighting installed in the ground with stakes, the lights are installed individually in the socket and then the socket assembly must be installed. This individual assembly process is time consuming, complicated, and the assembly string light can lack stability when placed in the ground. Additionally, in traditional string lighting, if one light or other electrical connection fails, a large section or the entire string light ceases to illuminate. Accordingly, a more sophisticated, stable, and pre-assembled light assembly would be useful.

SUMMARY

An electrical light assembly is provided. The electrical light assembly includes a base and a socket. The base includes a cord platform, a stem, a first tab, a second tab, and one or more fins. The fins extend radially from the stem. The socket is configured to engage with the base using the first tab and the second tab. The socket includes a housing with internal threads designed to engage a light bulb, a first connector including a first connection point provided in the form of a first sharp point, and a second connector including a second connection point provided in the form of a second sharp point. The first connection point and the second connection point are offset from one another.

In some embodiments, the first connection point and the second connection point are offset from a central plane of the socket. In some embodiments, the first connection point and the second connection point are offset from a central ridge of the socket. In some embodiments, the base has a first central ridge, and the socket has a second central ridge opposite the first central ridge. In some embodiments, the base engages the socket in a snap fit configuration. In some embodiments, the base engages the socket via flexible barbed tabs. In some embodiments, the flexible barbed tabs extend into the housing. In some embodiments, the first connection point and the second connection point are provided in the form of a conductive material. In some embodiments, the first connector includes a first contact pad, the second connector includes a second contact pad, and the first contact pad and the second contact pad are aligned with one another. In some embodiments, the first contact pad and the second contact pad are aligned with a central plane of the socket. In some embodiments, the base and the socket define a passageway. In some embodiments, the first connection point and the second connection point extend into the passageway designed to secure an electrical cord. In some embodiments, the housing has a first arch and a second arch, the first connection point extends from the housing along the first arch, and the second connection point extends from the housing along the second arch. In some embodiments, the socket has a first leg and a second leg, and the first leg and the second leg abut the base.

In some aspects, an electrical light assembly is provided. The electrical light assembly includes a socket with internal threads designed to receive a light bulb. The socket includes a first contact pad and a second contact pad. The base includes a first tab and a second tab configured to engage with the socket in a snap fit configuration. The base is designed to clamp an electrical cord between the base and the socket and place the light bulb in electrical communication with the electrical cord using the first contact pad and the second contact pad.

In some embodiments, the socket includes a first connector and a second connector, and the light bulb is in electrical communication with the electric cord via the first connector and the second connector. In some embodiments, the first connector includes a first connection point configured to pierce an insulative jacket of the electrical cord, and the second connector includes a second connection point configured to pierce the insulative jacket. In some embodiments, the first connection point and the second connection point are offset from one another. In some embodiments, the first connection point is configured to contact a first conductor of the electrical cord, and the second connection is configured to contact a second conductor of the electrical cord.

An electrical light assembly is provided. The electrical light assembly includes a base and a socket. The base includes a cord platform with a first trough and a second trough, a stem, a first tab with a first barb, a second tab with a second barb, and one or more fins. The fins extend radially from the stem. The socket is configured to engage with the base using the first tab and the second tab. The socket includes a housing with internal threads designed to engage a light bulb, a first connector including a first connection point provided in the form of a first sharp point. The socket further includes a first contact pad in electrical communication with the first connector. The second connector includes a second connection point provided in the form of a second sharp point. The first connection point and the second connection point are offset from one another. The socket also includes a second contact pad in electrical communication with the second connector.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
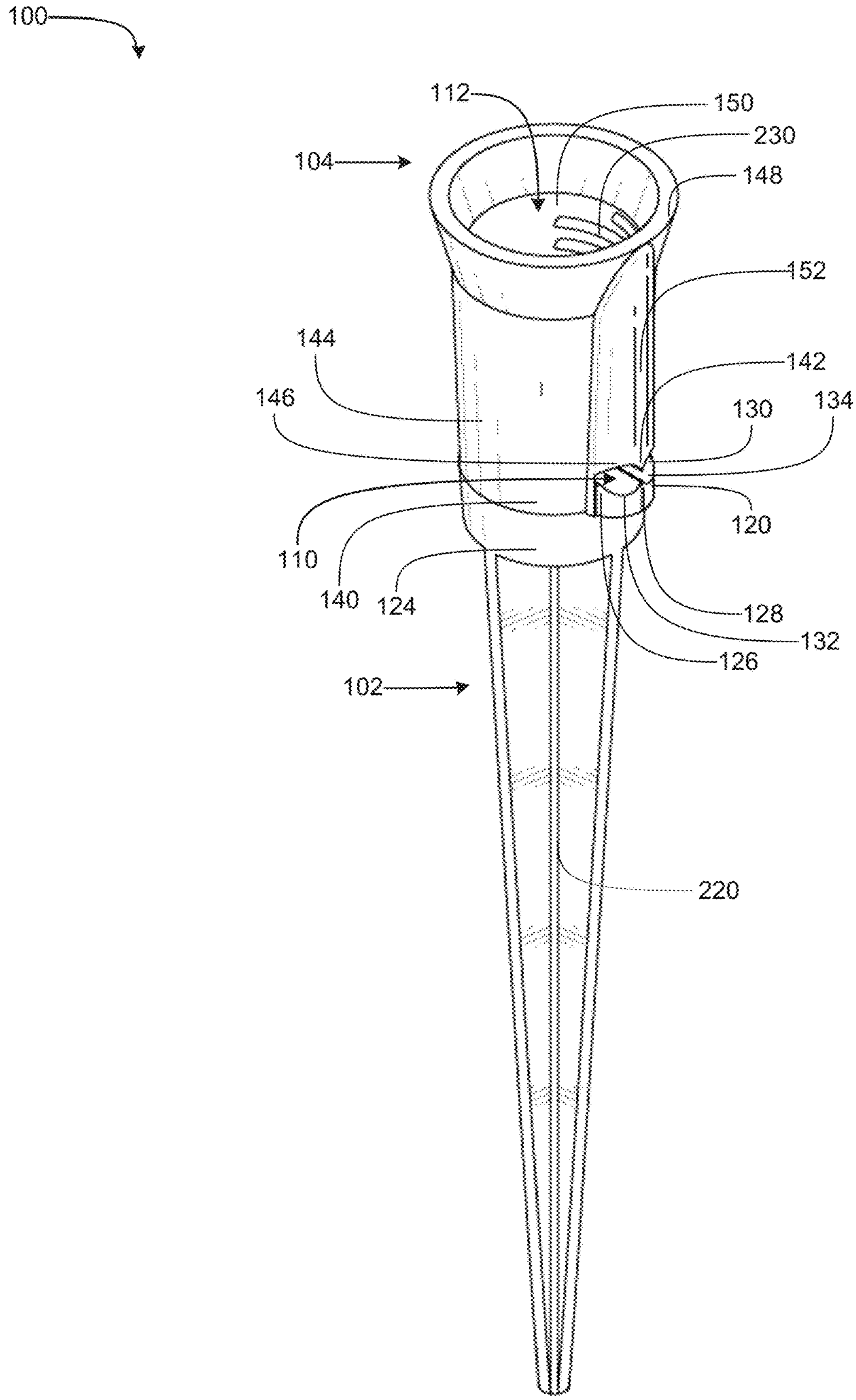
FIG. 1 is a front isometric view of an electrical light assembly according to an embodiment.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein are for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

An advanced electrical lighting assembly is provided. The electrical lighting device is designed to be pre-assembled so that an end user is not tasked with the time-consuming assembly process of the individual components. The electrical lighting assembly is durable and user-friendly.

FIG. 1 illustrates an electrical light assembly 100 according to an embodiment. The electrical light assembly includes a base 102 connected to a socket 104. In the example of FIG. 1, the base 102 is provided in the form of a ground stake. It should be understood that the base 102 may be shaped into any geometry and may include various elements configured to connect to various substrates or structures (e.g., a pole, a clip, a hook, a magnetic plate, a screw, an adhesive-coated plate, hook and loop connectors, a zip tie, a rope, a rivet, a bungee cord, etc.).

When connected, the base 102 and the socket 104 define a passageway 110 to receive an electrical cord and create an electrical connection between the electrical cord and conductive portions of the socket 104, as will be explained in greater detail below. The base 102 and the socket 104 further define a cavity 112 to receive a light bulb 240, as will be explained in greater detail below. The socket 104 is provided with internal threads 230 to engage with threads on the light bulb 240 (see FIGS. 11 and 13). In at least this way, the assembled electrical light assembly 100 creates a durable and electrically connected device that allows the user to install the base (e.g., insert the ground stake into the ground), plug in the electrical cord, and enjoy the electrical light assembly without the cumbersome process of assembling the individual components.

Referring still to FIG. 1, the base 102 includes a cord platform 120 and one or more fins 190 extending in an opposite direction from a plate 124 of the base 102. The cord platform 120 includes a first outer ridge 126, a first central ridge 128, and a second outer ridge 130, which form a first trough 132 and a second trough 134. The first trough 132 and the second trough 134 are each designed to secure a bottom portion of a strand of the electrical cord.

The socket 104 includes a first leg 140 and a second central ridge 142 extending from a housing 144, which forms a first arch 146. The housing 144 includes a collar 148 extending from a lower portion of the housing 144. In some embodiments, the collar 148 is frustro-conical. In some embodiments, the lower portion of the housing 144 is substantially cylindrical. In some aspects, the housing 144 further includes a protrusion 152 provided in the form of a pointed horseshoe arch, a parabolic arch, or similar. The inner portion of the protrusion 152 is designed to contain a first connector 170 within a channel 164, as described in more detail in connection with FIG. 3.

Figure 2:
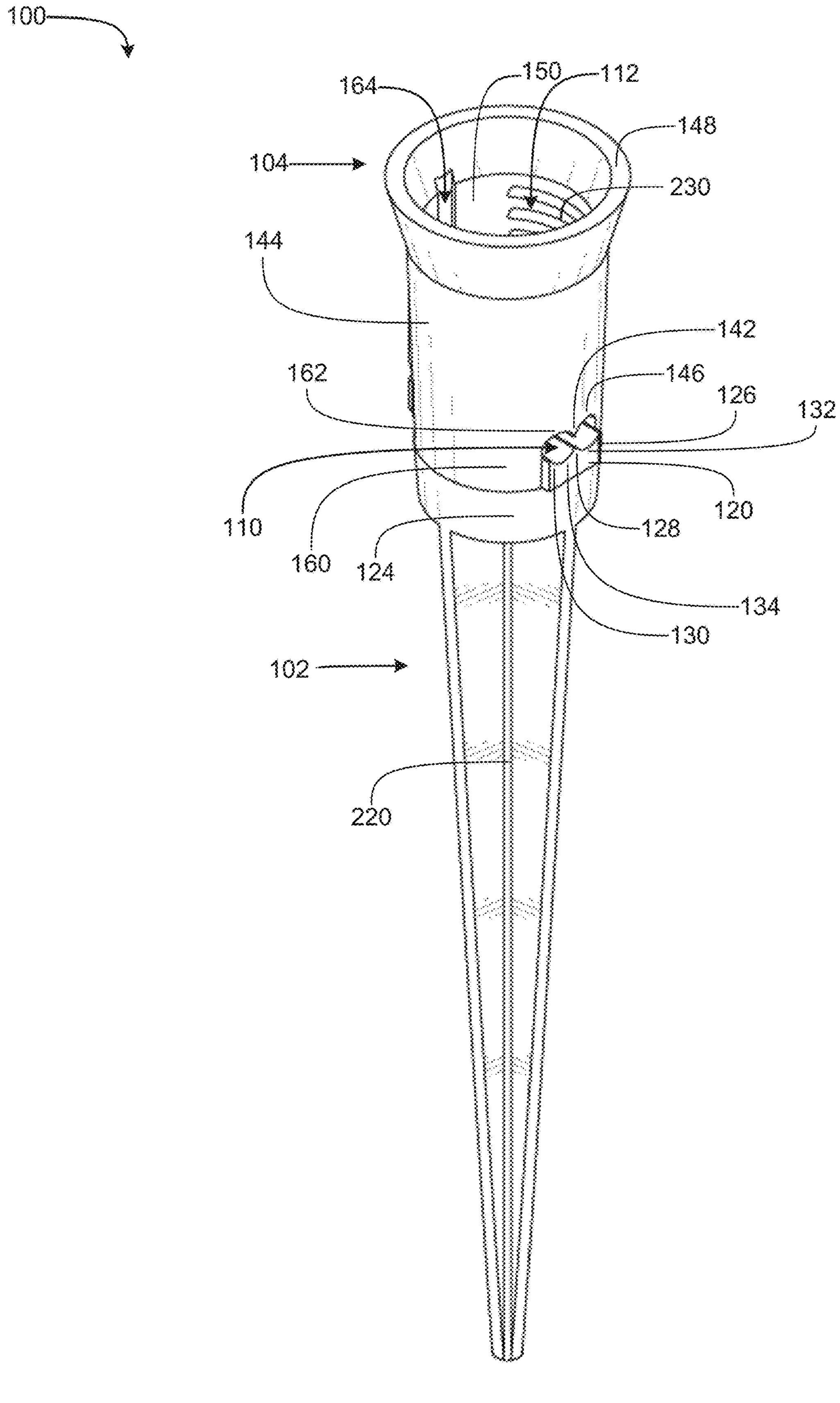
FIG. 2 is a rear isometric view of the electrical light assembly of FIG. 1.

Referring to FIG. 2, the socket 104 further includes a second leg 160 extending from the housing 144. The second central ridge 142, the housing 144, and the second leg 160 form a second arch 162. More specifically, the first trough 132, the second trough 134, the first arch 146, and the second arch 162 define the passageway 110. The passageway 110 is designed to secure the electrical cord. Additionally, the housing 144 defines the channel 164, which is within the protrusion 152 and is designed to secure the first connector, as described in more detail in connection with FIG. 3.

Figure 3:
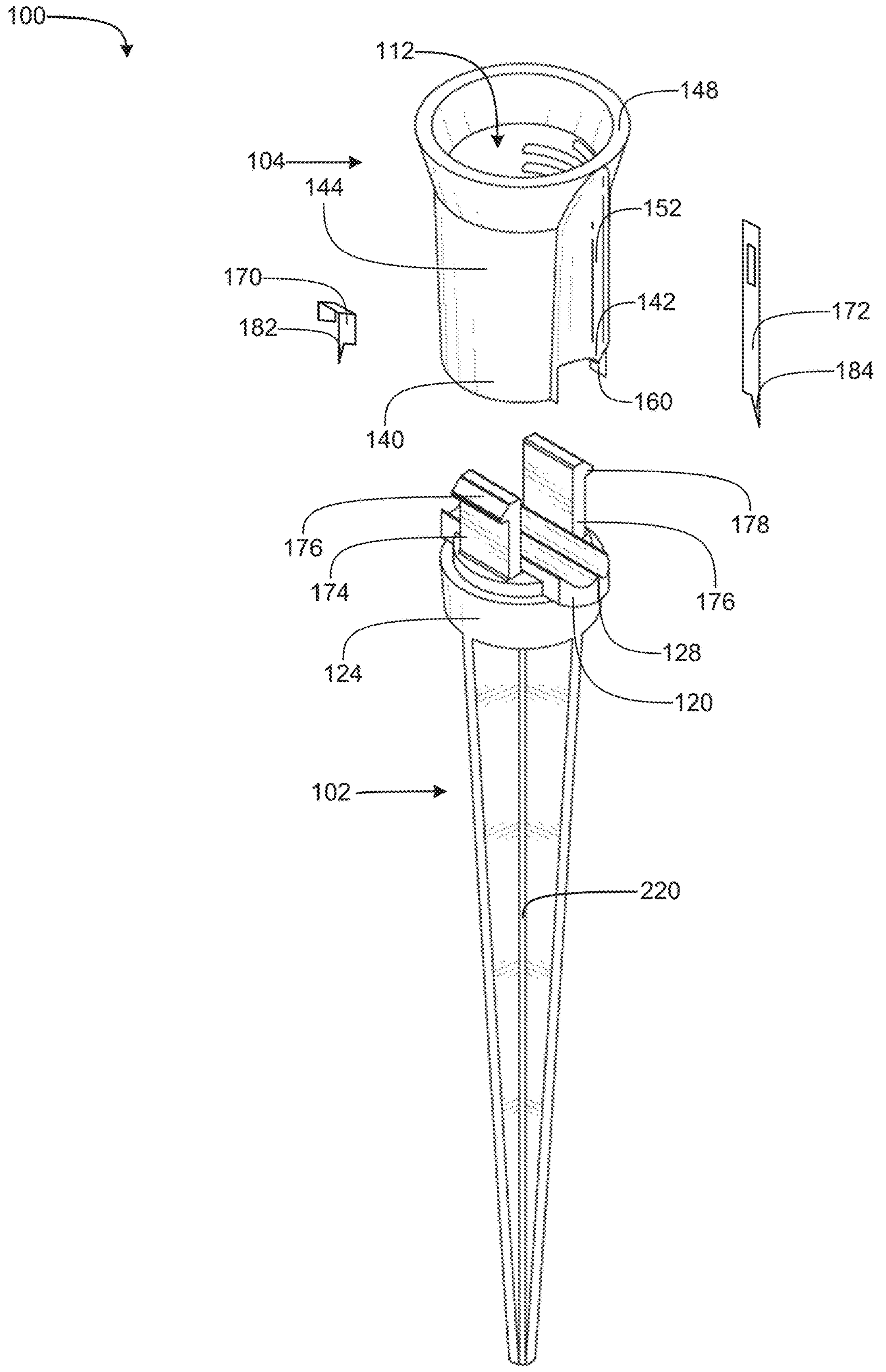
FIG. 3 is an exploded isometric view of the electrical light assembly of FIG. 1.

Referring to FIG. 3, the electrical light assembly of 100 further includes a first connector 170 and a second connector 172. The first connector 170 and the second connector 172 are formed of an electrically conductive material (e.g., copper, aluminum, etc.). The socket 104 further includes a first tab 174 and a second tab 176 extending upwardly and substantially perpendicular from the cord platform 120. The first tab 174 and the second tab 176 are rigidly flexible, such that the first tab 174 and the second tab 176 are provided in the form of a flexible hard plastic that is rigid, but can bend slightly inward when compressed (e.g., to snap the socket to the base). The first tab 174 and the second tab 176 include a first barb 178 and a second barb 180, respectively. In some aspects, the first barb 178 and the second barb 180 are provided in the form of a partial T-shape, L-shape, the shape of the numeral 1, or similar. When assembled, the first tab 174 and the second tab 176 engage the socket 104 via the first barb 178 and the second barb 180 in a snap fit configuration, respectively. The first connector 170 and the second connector 172 are each sharply pointed, terminating in a first connection point 182 and a second connection point 184, respectively. The first connection point 182 and the second connection point 184 are designed to pierce the electrical cord and establish an electrical connection between the electrical cord and the socket 104, as described in more detail in connection with FIGS. 14 and 15.

Figure 4:
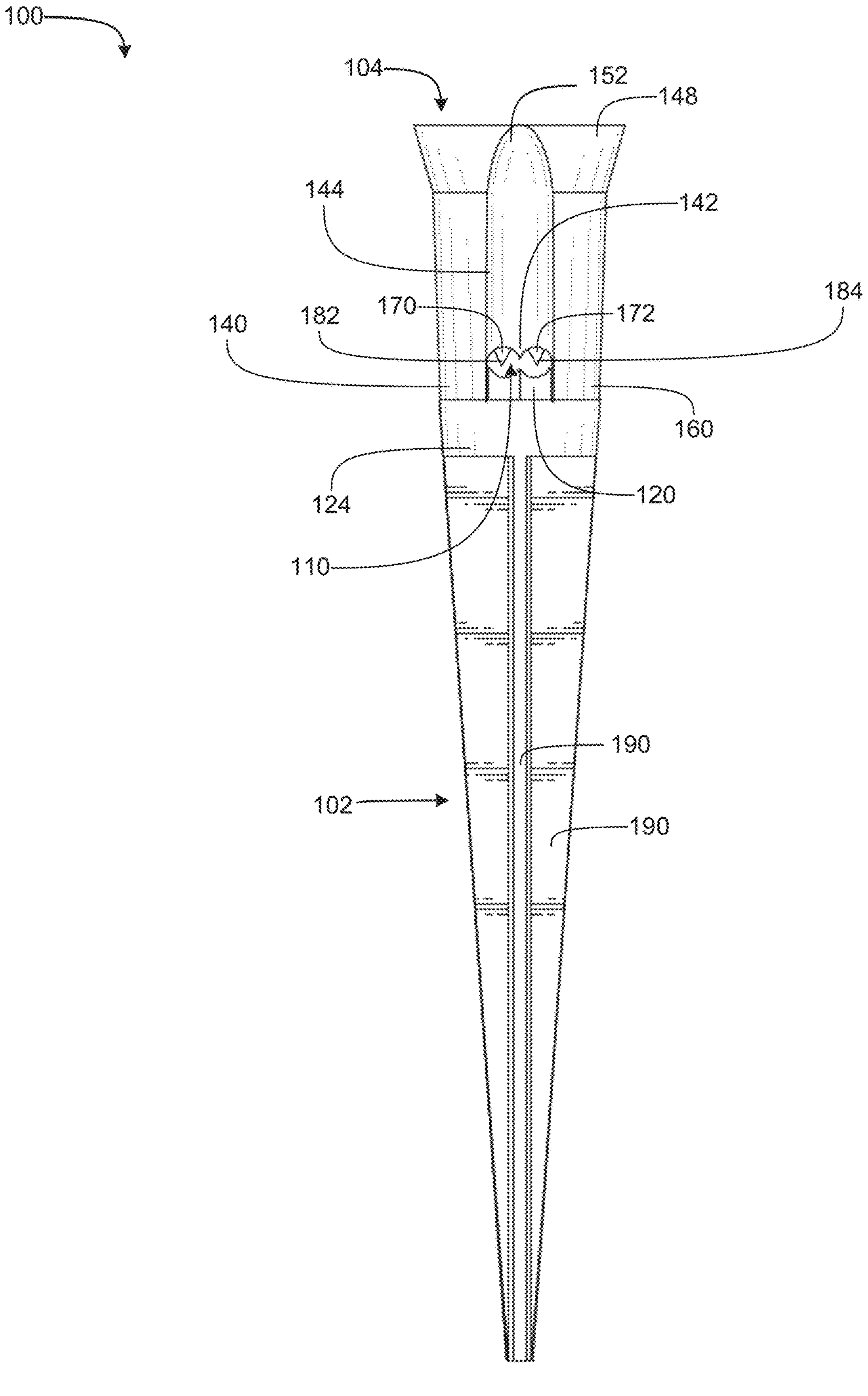
FIG. 4 is a front elevational view of the electrical light assembly of FIG. 1.
Figure 5:
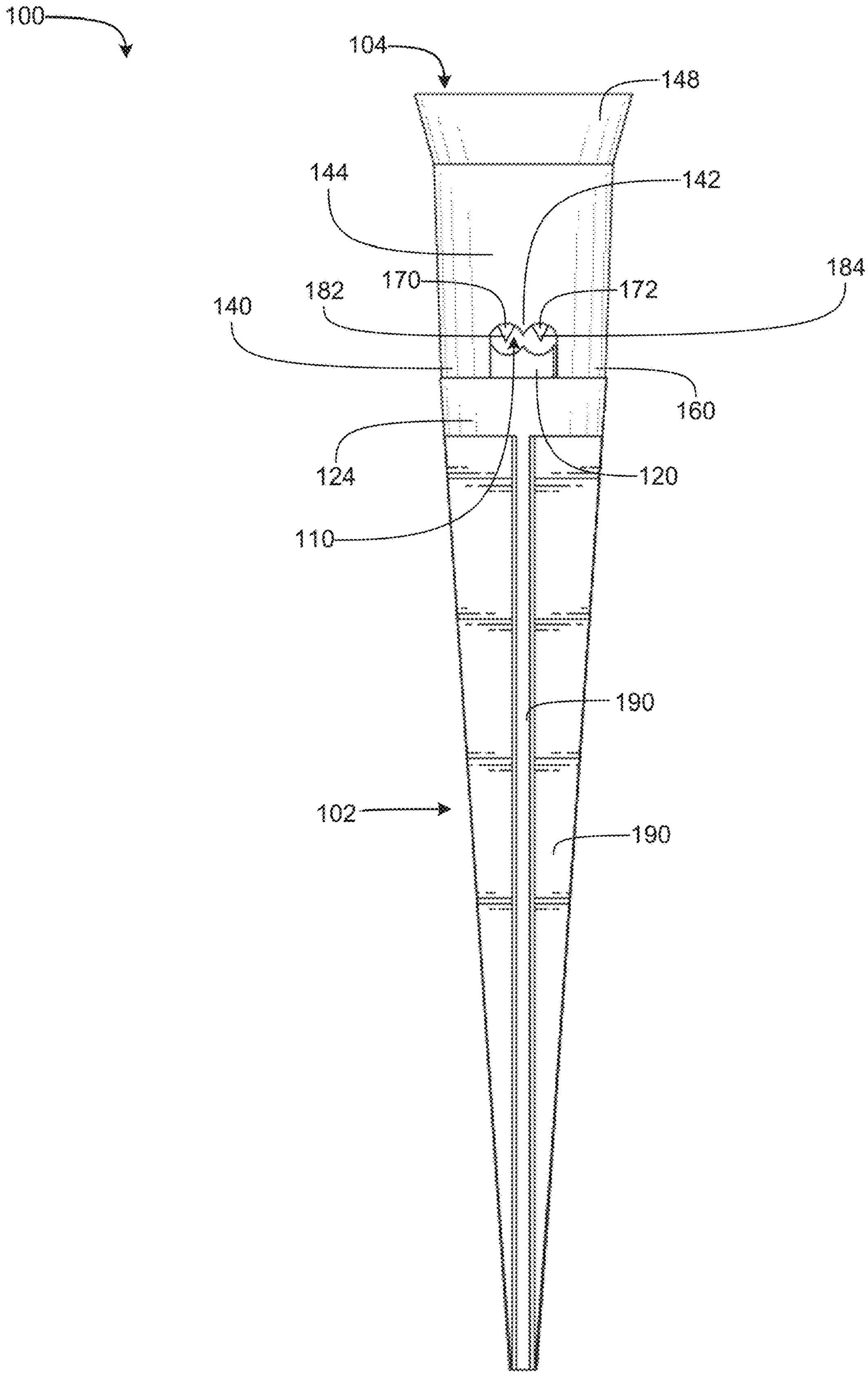
FIG. 5 is a rear elevational plan view of the electrical light assembly of FIG. 1.

Referring to FIGS. 4 and 5, when assembled, the first leg 140 and the second leg 160 abut the plate 124 of the base 102. Further, the first connection point 182 and the second connection point 184 extend into the passageway 110. It should be appreciated that the first connection point 182 and the second connection point 184 are offset oppositely from one another and the second central ridge 142. More specifically, the first connection point 182 and the second connection point 184 are offset from the second central ridge 142.

Figure 6:
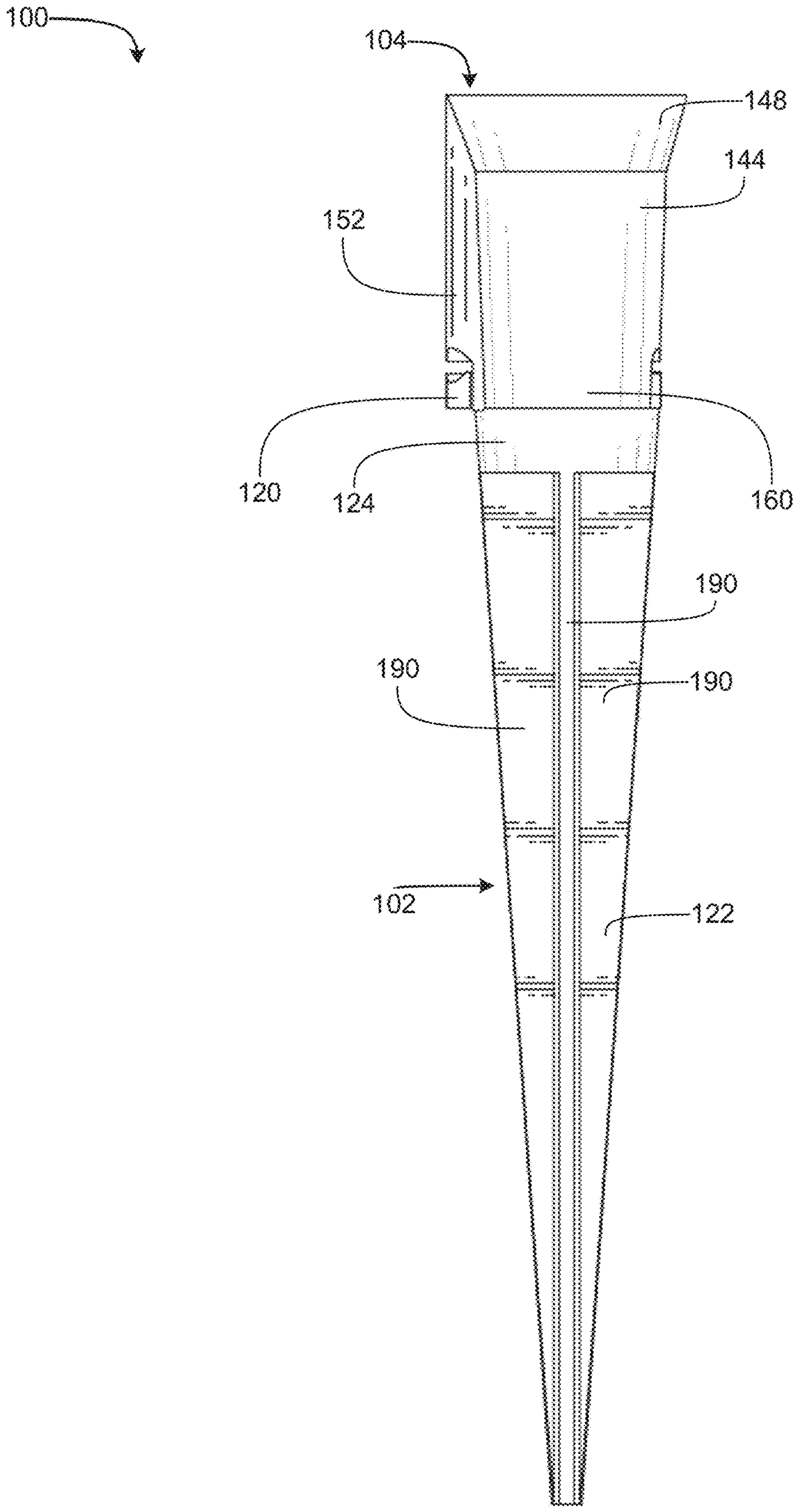
FIG. 6 is a first side elevational view of the electrical light assembly of FIG. 1.
Figure 7:
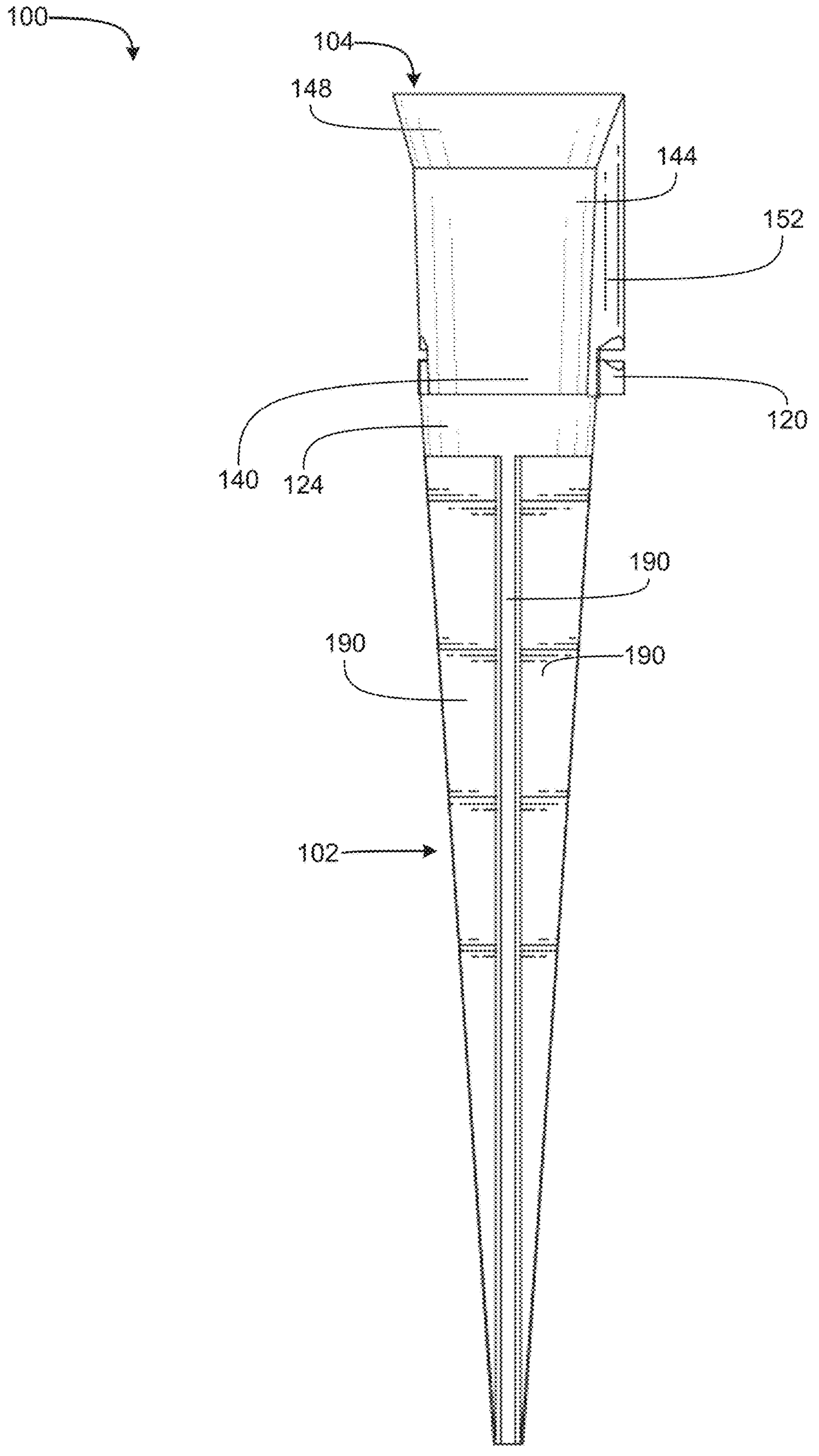
FIG. 7 is a second elevational view of the electrical light assembly of FIG. 1.

Referring to FIGS. 6 and 7, in some embodiments, the one or more fins 190 are connected to one another and the plate 124 via a stem 220 that extends substantially perpendicular from the plate 124. In some embodiments, the fins 190 are tapered, such that the fins 190 are wider at an end connecting to the plate 124 than they are at an end opposite the socket 104. In some forms, the fins are provided in the form of a durable thermoplastic material, although other weatherproof materials suitable for being placed in the ground and/or outside are contemplated. The socket 104 further includes a protrusion 152 extending outwardly from the housing 144. The cord platform 120 extends beyond the plate 124 and aligns with the protrusion 152.

Figure 8:
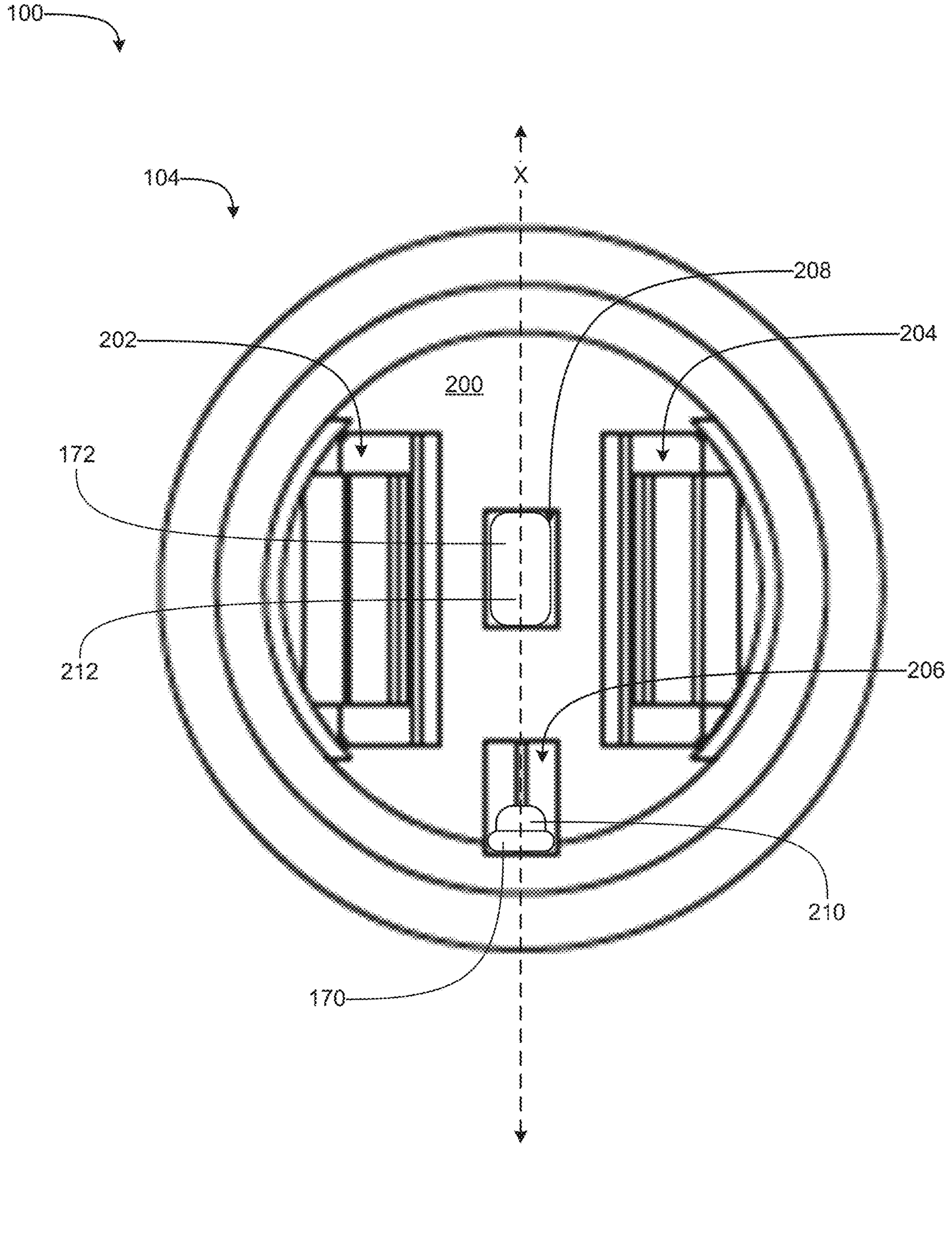
FIG. 8 is a top plan view of the electrical light assembly of FIG. 1.

Turning to FIG. 8, the housing 144 further includes a floor 200 connected to an inner portion of the housing 144 that further defines the cavity 112. The floor 200 defines a first side opening 202, a second side opening 204, a first central opening 206, and a second central opening 208. The first central opening 206 is between the first side opening 202 and the second side opening 204. The second central opening 208 is aligned with the first central opening 206 and is partially between the first side opening 202 and the second side opening 204. More specifically, a central plane X of the electrical light assembly 100 passes through the first central opening 206 and the second central opening 208.

The first tab 174 and the second tab 176 extend through the first side opening 202 and the second side opening 204, respectively, to engage the housing 144. More specifically, the first barb 178 and the second barb 180 snap against the housing 144 and hook onto the floor 200. Further, the first connector 170 is seated in the channel 164. The second connector 172 is seated on the floor 200. Further, the first connector 170 and the second connector 172 include a first contact pad 210 and a second contact pad 212, respectively. The first contact pad 210 and the second contact pad 212 are provided in the form of an electrically conductive material (e.g., copper, aluminum, etc.).

Figure 9:
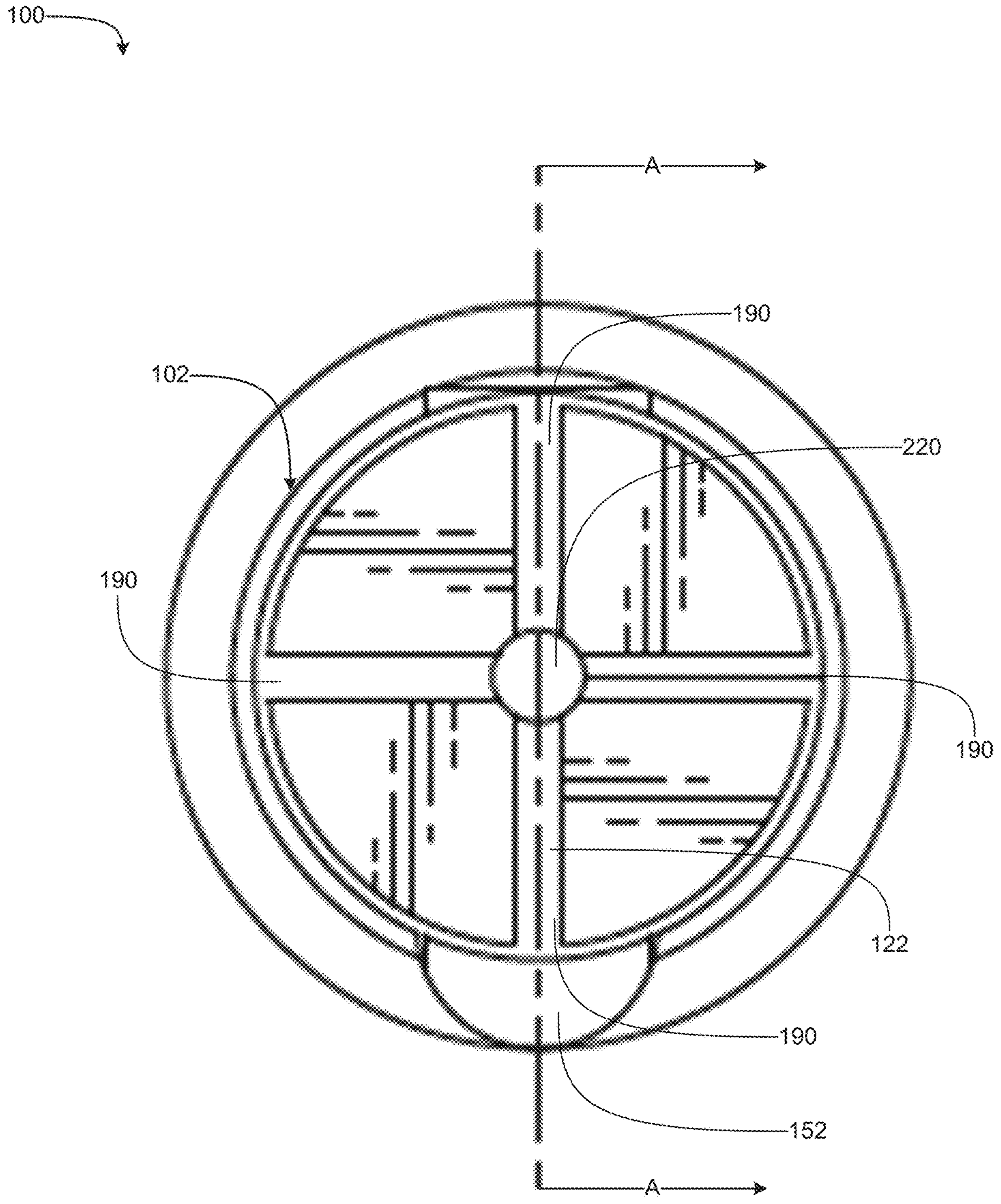
FIG. 9 is a bottom plan view of the electrical light assembly of FIG. 1.

Referring to FIG. 9, in some embodiments, the fins 190 extend radially from a stem 220. In the embodiment shown in FIG. 9, the electric light assembly 100 is provided with four fins 190, extending radially from the stem 220 to form a point at an end opposite the plate 124, although other configurations with various quantities of fins may be provided for different applications and ground surfaces.

Figure 10:
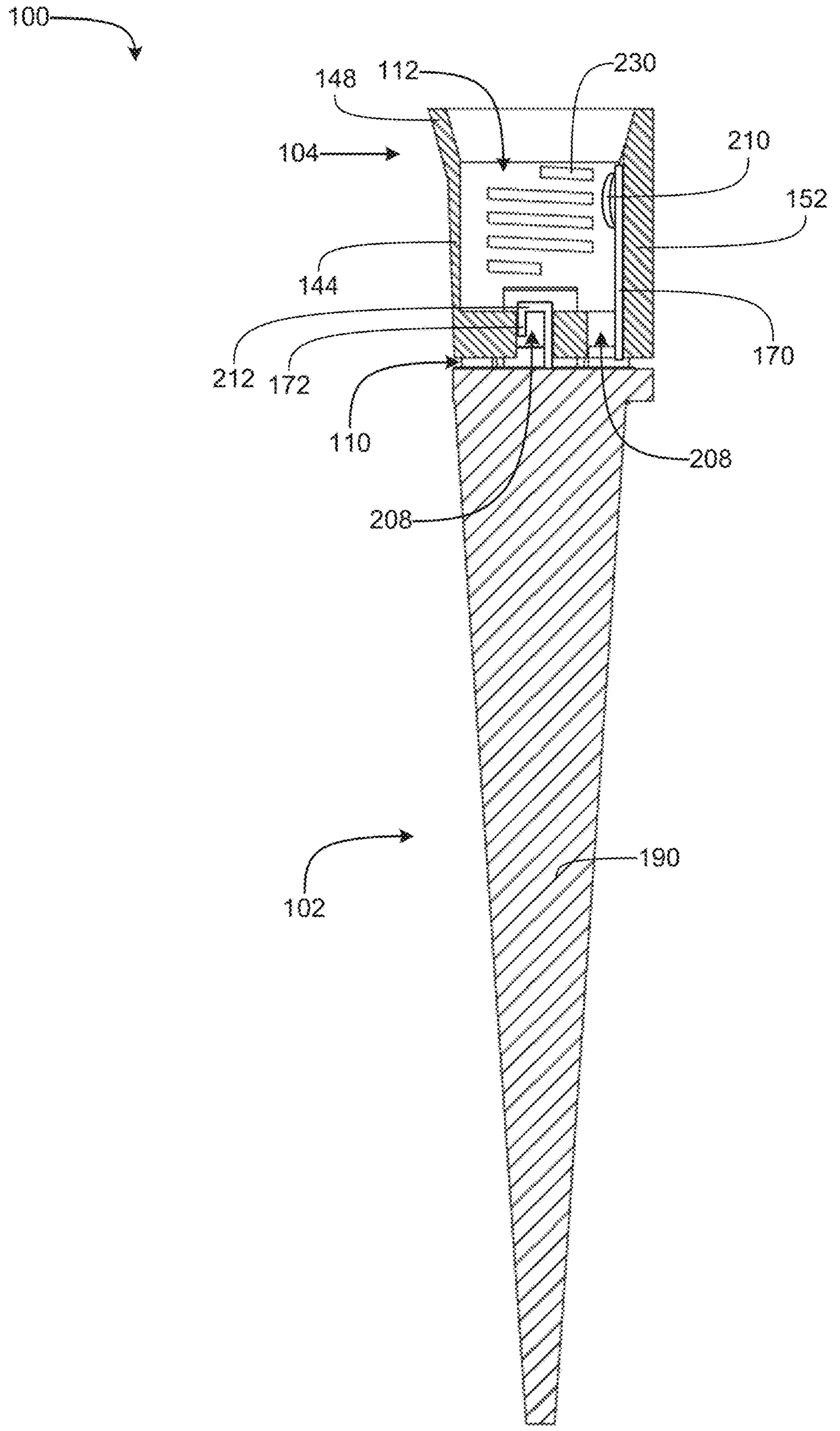
FIG. 10 is a cross-sectional view of the electrical light assembly of FIG. 1, taken along line A-A of FIG. 9.

Turning to FIG. 10, the housing 144 further includes internal threads 230. Further, the first contact pad 210 and the second contact pad 212 extend into the cavity 112. The cavity 112 communicates with the passageway 110 via the first central opening 206 and the second central opening 208. The first connector 170 extends through the first central opening 206. The second connector 172 extends through the second central opening 208. Additionally, the protrusion 152 stiffens the housing 144 to support the first connector 170.

Figure 11:
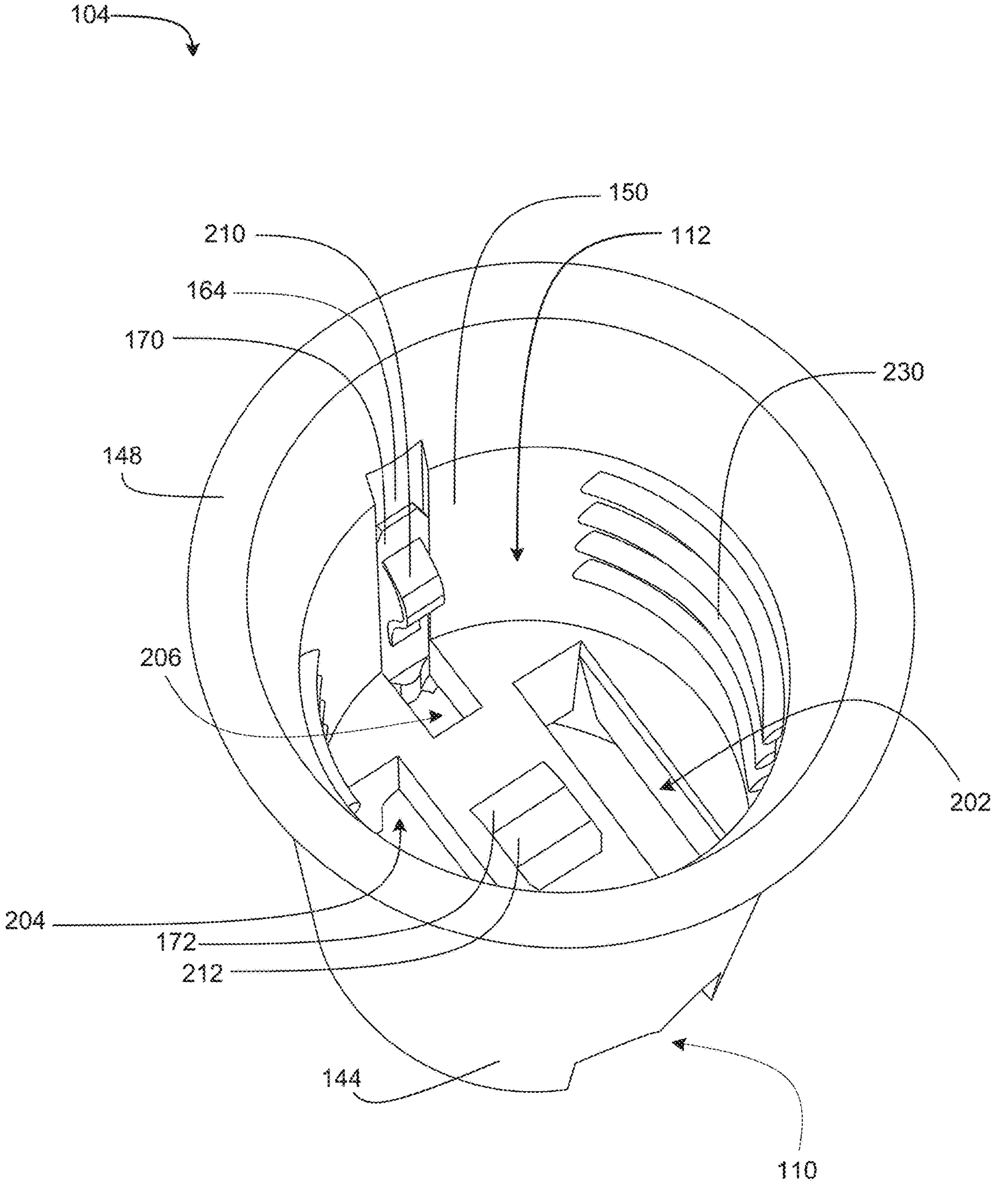
FIG. 11 is a top isometric view a socket of the electrical light assembly of FIG. 1.

Turning to FIG. 11, the internal threads 230 extend from an inner portion 150 of the housing 144 into the cavity 112. The internal threads 230 are designed to couple to external threads of a light bulb 240 (see FIG. 13). Additionally, the first contact pad 210 is arcuate, arched, or otherwise protrudes from the first connector 170 toward a center of the cavity 112. In at least this way, when a light bulb 240 is installed in the cavity 112, an electrical cord is positioned in the passageway 110, and the socket 104 is engaged with the base 102, the electrical lighting assembly 100 provides an electrical connection between the electrical cord via the first connector 170 and the light bulb 240, wherein the first contact pad 210 is configured to contact a conductive portion of the light bulb 240, and the conductive portion of the lightbulb is also configured to contact the second contact pad 212 when the light bulb 240 is screwed into the cavity 112 using the internal threads 230.

Figure 12:
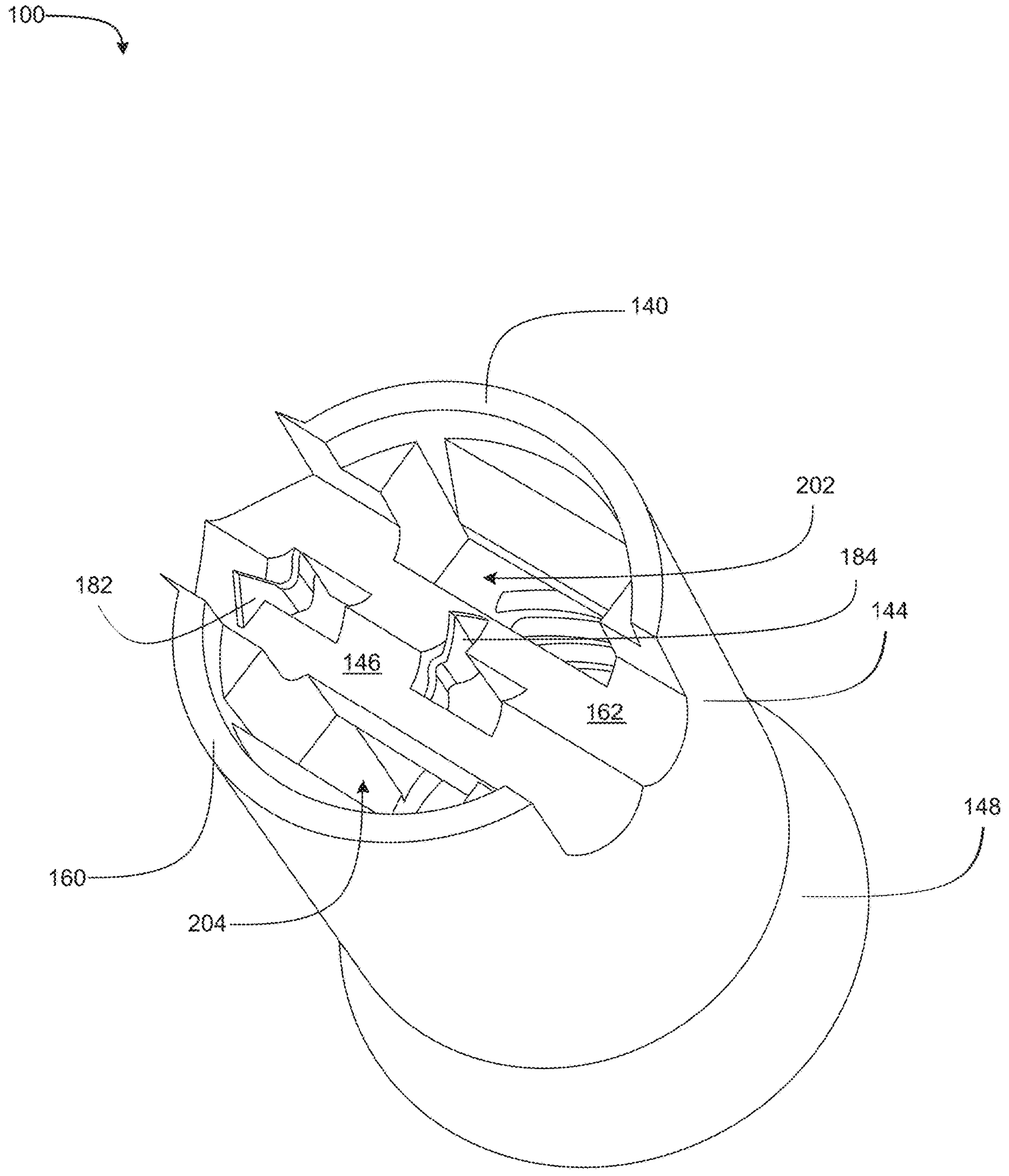
FIG. 12 is a bottom isometric view of the socket of FIG. 11.

Referring to FIG. 12, the first connection point 182 is located medially between the second central ridge 142 and the first leg 140 along the first arch 146. Similarly, the second connection point 184 is located medially between the second central ridge 142 and the second leg 160 along the second arch 162. In some forms, the first connection point 182 and the second connection point 184 are provided in the form of sharp points designed to pierce an outer jacket of an electrical cord, as described in more detail in connection with FIGS. 14 and 15.

Figure 13:
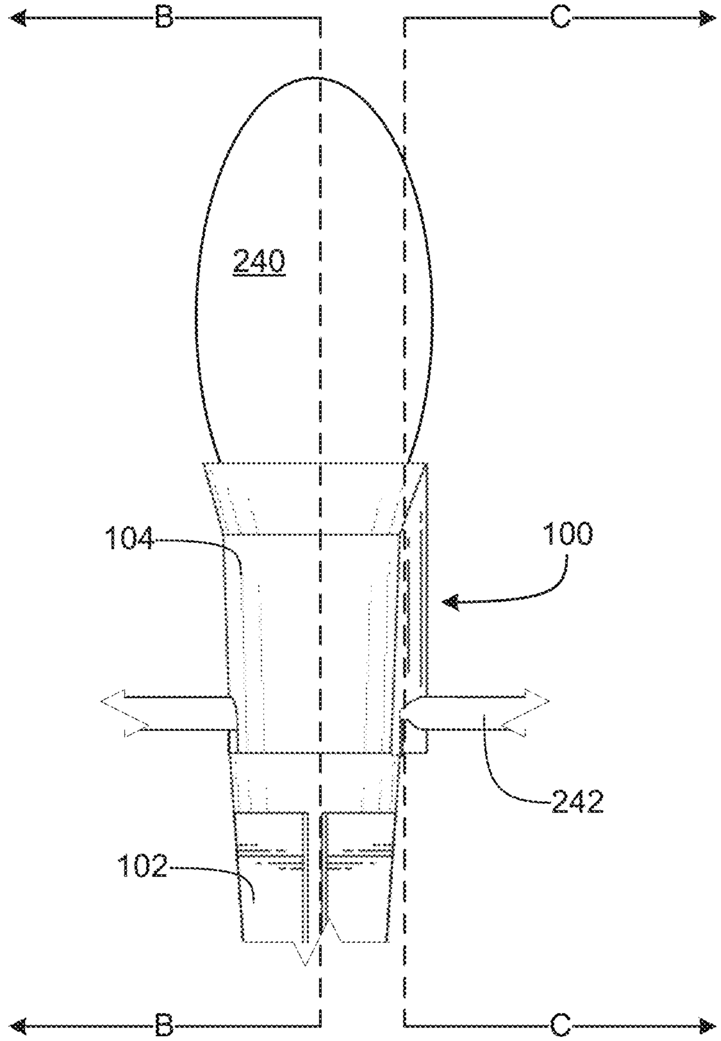
FIG. 13 is a partial side elevational view of an electrical cord and a light bulb installed into the electrical light assembly of FIG. 1.

Referring to FIG. 13, a light bulb 240 (e.g., a C9 decorative bulb, LED bulb, incandescent bulb, halogen bulb, etc.) is engaged with the socket 104. In some embodiments, the light bulb 240 is threaded into the socket 104 using the internal threads 230 (see FIG. 11). Additionally, an electrical cord 242 is secured between the base 102 and the socket 104. The light bulb 240 is in electrical communication with the electrical cord 242 via the first connector 170 and the second connector 172 and the first contact pad 210 and the second contact pad 212 (shown in FIGS. 11-13).

Figure 14:
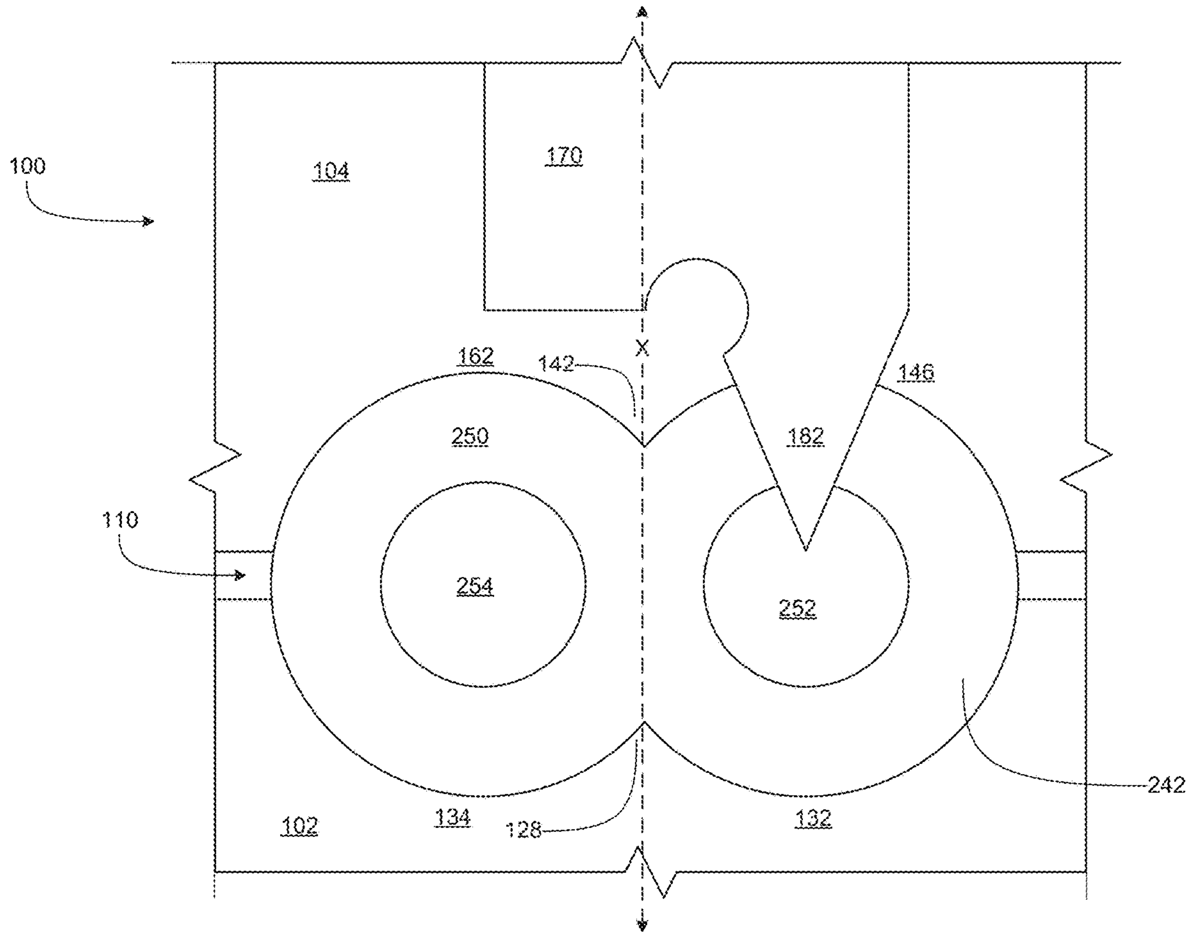
FIG. 14 is a partial, schematic cross-sectional view of the electrical cord and the light bulb installed into the electrical light assembly of FIG. 13 taken along line B-B of FIG. 13.

Turning to FIG. 14, the electrical cord 242 includes an insulative jacket 250 surrounding a first conductor 252 and a second conductor 254. More specifically, the insulative jacket 250 separates and electrically isolates the first conductor 252 from the second conductor 254. The electrical cord 242 is positioned in the passageway 110 along the first trough 132, the second trough 134, within the first arch 146, and the second arch 162, such that a bottom portion of each conductor rests within the first trough 132 and the second trough 134, respectively. A top portion of each conductor rests within the first arch 146 and the second arch 162, respectively, such that each conductor is secured within one half of the passageway 110.

The first connection point 182 is offset from the central plane X and aligns with the first conductor 252. When the base 102 and the socket 104 are pressed together, the floor 200 and the cord platform 120 are brought together to clamp or otherwise secure the electrical cord 242 within the passageway 110. More specifically, the first central ridge 128 and the second central ridge 142 are brought together to compress the insulative jacket 250 and thus tightly retain the electrical cord 242. The first connection point 182 pierces through the insulative jacket 250 and is inserted into the first conductor 252. Thus, the first connector 170 is in electrical communication with the first conductor 252. It should be appreciated that, because the first connection point 182 is offset from the central plane X, the first connector 170 is not in electrical communication with the second conductor 254.

Figure 15:
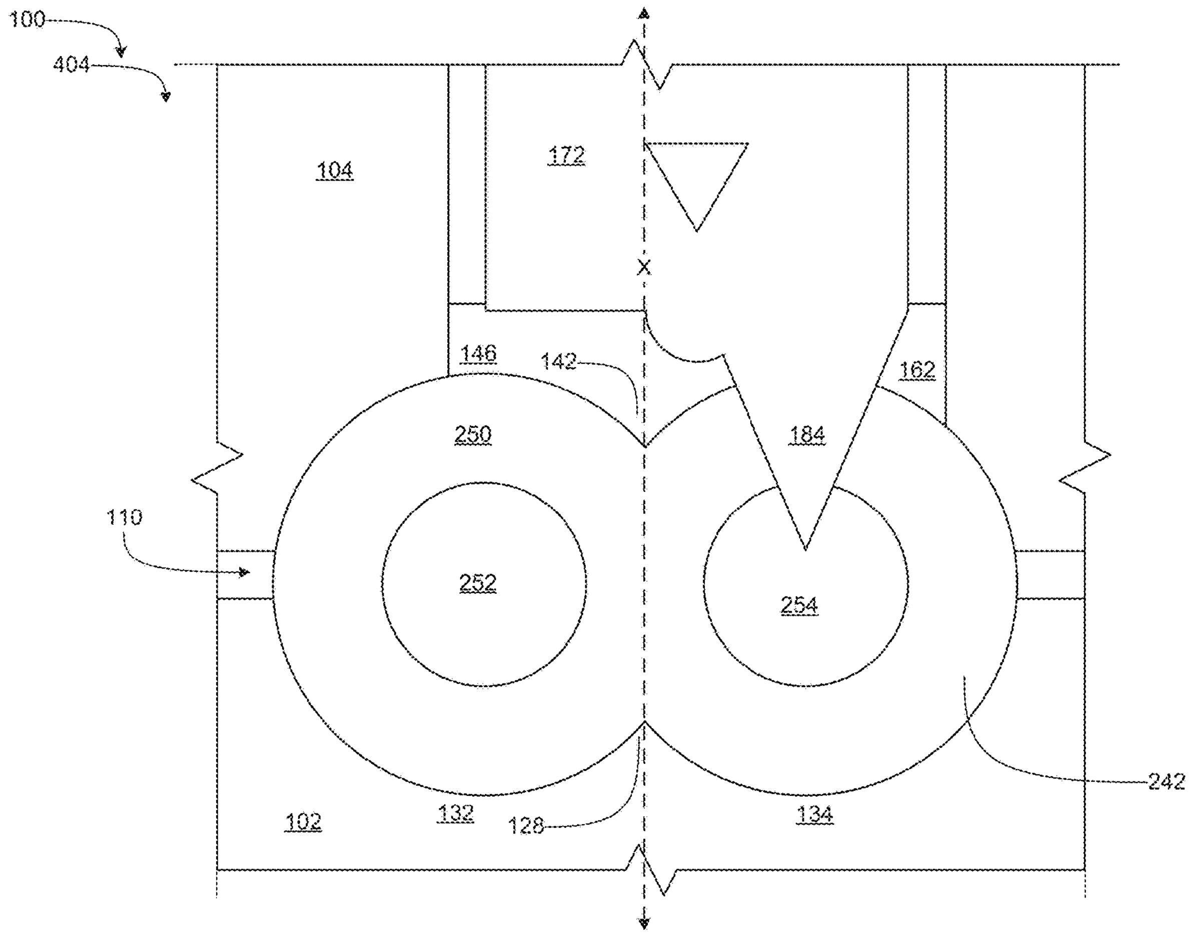
FIG. 15 is a partial, schematic cross-sectional view of the electrical cord and the light bulb installed into the electrical light assembly of FIG. 13 taken along line C-C of FIG. 13.

Referring to FIG. 15, similarly, the second connection point 184 is offset from the central plane X and aligns with the second conductor 254. When the base 102 and the socket 104 are pressed together, the second connection point 184 pierces through the insulative jacket 250 and is inserted into the second conductor 254. Thus, the second connector 172 is in electrical communication with the second conductor 254. It should be appreciated that, because the second connection point 184 is offset from the central plane X, the second connector 172 is not in electrical communication with the first conductor 252.

Figure 16:
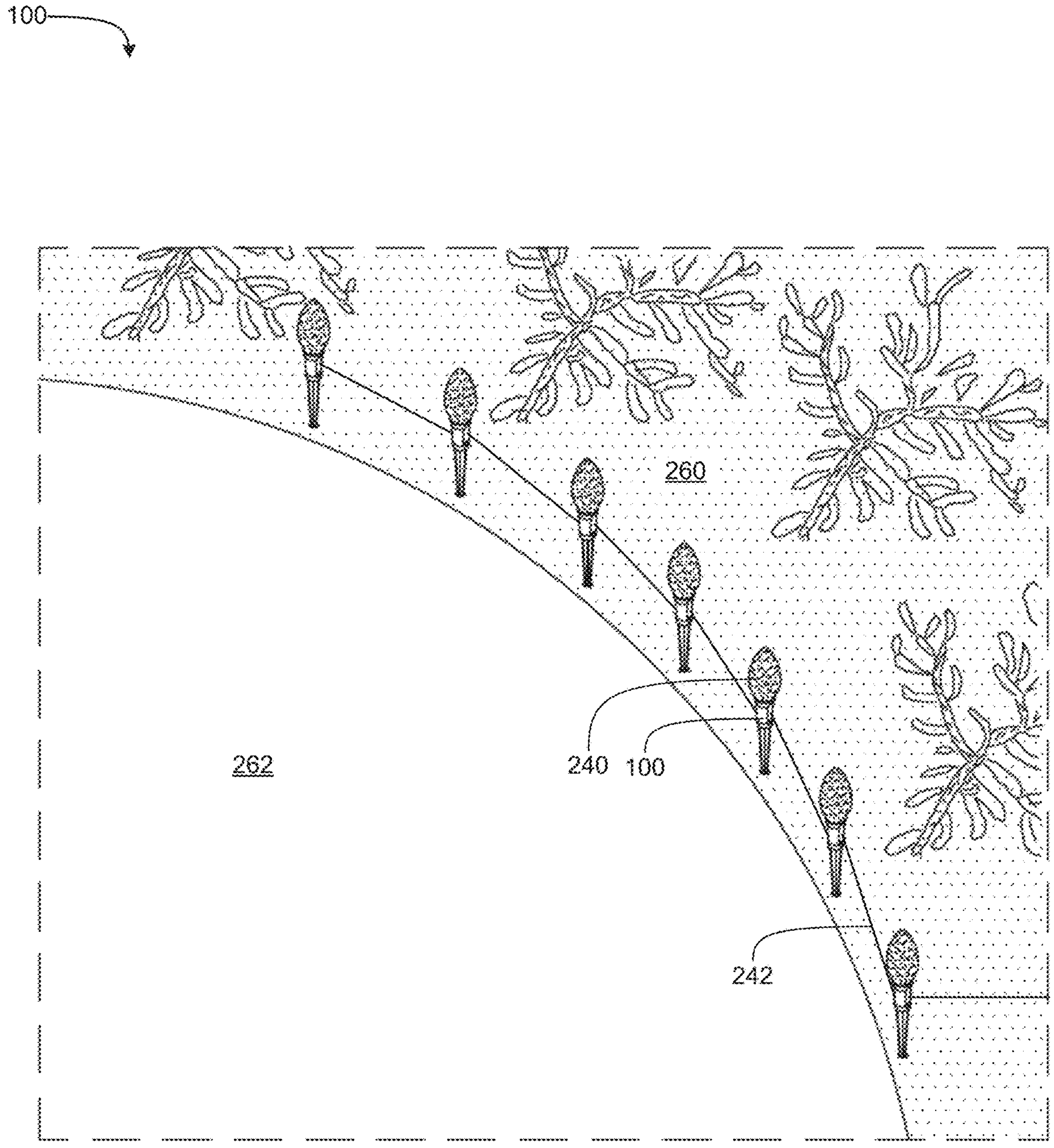
FIG. 16 is an isometric view of the electrical cord and multiple light bulbs installed into multiple electrical light assemblies of FIG. 13 in an outdoor environment.

Referring to FIG. 16, multiple light bulbs 240 may be respectively mounted into multiple electrical light assemblies 100. Further, one or more electrical light assemblies 100 may be secured along a length of the electrical cord 242. Thus, each of the multiple light bulbs 240 is in electrical communication with the electrical cord via the multiple electrical light assemblies 100. It should be appreciated that the electrical light assemblies 100 may be placed at any desired location along to electrical cord 242. For example, the electrical light assemblies may be clustered together, spaced regularly, spaced randomly, etc. Additionally, the electrical light assemblies 100 may be removed and/or repositioned along the electrical cord 242. In such instances, the electrical cord 242 may be patched with tape, a shrink sleeve, a housing, etc. Further, in some embodiments, each of the electrical light assemblies 100 may be staked into the ground 260. The light bulbs 240 may be powered by the electrical cord 242 to illuminate a pathway 262, driveway, yard, or other structure or area.

Figure 17:
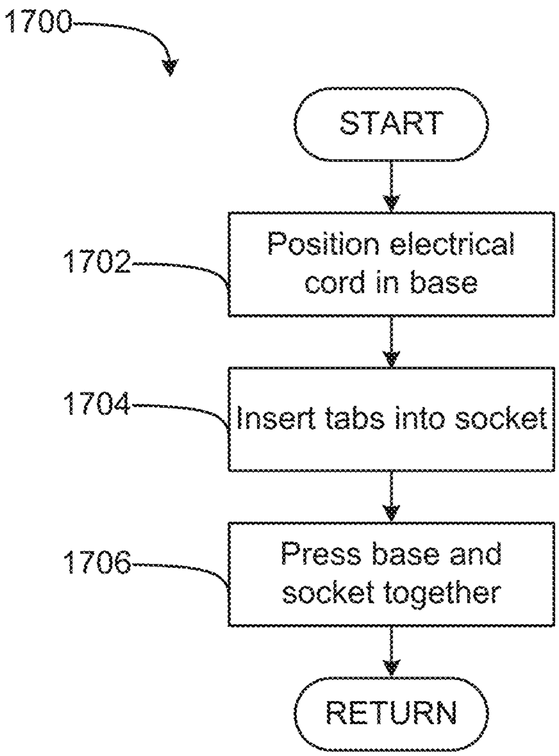
FIG. 17 is a flow diagram depicting a method to install the electrical cord and the light bulb into the electrical light assembly as shown in FIG. 13, according to the principles of this disclosure.

FIG. 17 illustrates a flow diagram depicting a method 1700 to install the electrical cord 242 and the light bulb 240 into the electrical light assembly 100 as shown in FIG. 13. The method 1700 includes positioning the electrical cord 242 in the base 102 at step 1702. More specifically, the electrical cord 242 is laid along the cord platform 120 along the first trough 132 and the second trough 134.

At step 1704, the first tab 174 and the second tab 176 are inserted into the socket 104. The first tab 174 and the second tab 176 are introduced into the first side opening 202 and the second side opening 204, respectively.

At step 1706, the base 102 and the socket are pressed together. More specifically, as the base 102 and the socket 104 are pressed together (e.g., snapped together or otherwise forcibly coupled), the first connection point 182 pierces the electrical cord 242 to contact the first conductor 252, the second connection point 184 pierces the electrical cord 242 to contact the second conductor 254. Further, the first tab 174 and the second tab 176 are pushed through the floor 200 to engage the housing 144 in a snap fit configuration. The method 1700 can be repeated for multiple electrical light assemblies 100 along an electrical cord 242.

In other embodiments, other configurations are possible. For example, those of skill in the art will recognize, according to the principles and concepts disclosed herein, that various combinations, sub-combinations, and substitutions of the components discussed above can provide appropriate cooling for a variety of different configurations of motors, pumps, electronic assemblies, and so on, under a variety of operating conditions.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An electrical light assembly comprising:
a base including:
- a cord platform;
- a stem;
- a first tab;
- a second tab;
- one or more fins extending radially from the stem; and a socket configured to engage with the base using the first tab and the second tab, the socket including:
- a housing with internal threads designed to engage a light bulb;
- a first connector including a first connection point provided in a form of a first sharp point;
- a second connector including a second connection point provided in the form of a second sharp point, wherein the first connection point and the second connection point being offset from one another.

2. The electrical light assembly of claim 1, wherein the first connection point and the second connection point are offset from a central plane of the socket.

3. The electrical light assembly of claim 1, wherein the first connection point and the second connection point are offset from a central ridge of the socket.

4. The electrical light assembly of claim 1, wherein the base has a first central ridge, and the socket has a second central ridge opposite the first central ridge.

5. The electrical light assembly of claim 1, wherein the base engages the socket in a snap fit configuration.

6. The electrical light assembly of claim 5, wherein the base engages the socket via flexible barbed tabs.

7. The electrical light assembly of claim 6, wherein the flexible barbed tabs extend into the housing.

8. The electrical light assembly of claim 1, wherein the first connection point and the second connection point are provided in the form of a conductive material.

9. The electrical light assembly of claim 1, wherein the first connector includes a first contact pad, the second connector includes a second contact pad, and the first contact pad and the second contact pad are aligned with one another.

10. The electrical light assembly of claim 9, wherein the first contact pad and the second contact pad are aligned with a central plane of the socket.

11. The electrical light assembly of claim 1, wherein the base and the socket define a passageway.

12. The electrical light assembly of claim 11, wherein the first connection point and the second connection point extend into the passageway.

13. The electrical light assembly of claim 1, wherein the housing has a first arch and a second arch, the first connection point extends from the housing along the first arch, and the second connection point extends from the housing along the second arch.

14. The electrical light assembly of claim 1, wherein the socket has a first leg and a second leg, and the first leg and the second leg abut the base.

15. An electrical light assembly comprising:

a socket with internal threads designed to receive a light bulb, wherein the socket includes a first contact pad and a second contact pad; and a base with a first tab and a second tab configured to engage with the socket in a snap fit configuration, wherein the base is designed to clamp an electrical cord between the base and the socket and place the light bulb in electrical communication with the electrical cord using the first contact pad and the second contact pad.

16. The electrical light assembly of claim 15, wherein the socket includes a first connector and a second connector, and the light bulb is in electrical communication with the electrical cord via the first connector and the second connector.

17. The electrical light assembly of claim 16, wherein the first connector includes a first connection point configured to pierce an insulative jacket of the electrical cord, and the second connector includes a second connection point configured to pierce the insulative jacket.

18. The electrical light assembly of claim 17, wherein the first connection point and the second connection point are offset from one another.

19. The electrical light assembly of claim 17, wherein the first connection point is configured to contact a first conductor of the electrical cord, and the second connection point is configured to contact a second conductor of the electrical cord.

20. An electrical light assembly comprising:

a base including:

a cord platform with a first trough and a second trough;

a stem;

a first tab with a first barb;

a second tab with a second barb;

one or more fins extending radially from the stem; and a socket configured to engage with the base using the first tab and the second tab, the socket including:

a housing with internal threads designed to engage a light bulb;

a first connector including a first connection point provided in the form of a first sharp point;

a first contact pad in electrical communication with the first connector, a second connector including a second connection point provided in a form of a second sharp point, wherein the first connection point and the second connection point being offset from one another;

a second contact pad in electrical communication with the second connector.

* * * * *